(12) United States Patent
Kishimoto

(10) Patent No.: US 11,371,900 B2
(45) Date of Patent: Jun. 28, 2022

(54) DIFFERENTIAL PRESSURE SENSOR WITH IMPROVED FILTER STABILITY

(71) Applicant: Mitsubishi Electric Corporation, Tokyo (JP)

(72) Inventor: Hiroyuki Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/081,293

(22) Filed: Oct. 27, 2020

(65) Prior Publication Data

US 2021/0208017 A1    Jul. 8, 2021

(30) Foreign Application Priority Data

Jan. 6, 2020 (JP) .............................. JP2020-000169

(51) Int. Cl.
  *G01L 9/00*   (2006.01)
  *G01L 13/02*  (2006.01)
  *G01L 19/06*  (2006.01)
  *G01L 19/00*  (2006.01)

(52) U.S. Cl.
  CPC .......... *G01L 13/025* (2013.01); *G01L 9/0052* (2013.01); *G01L 9/0072* (2013.01); *G01L 19/0038* (2013.01); *G01L 19/0627* (2013.01)

(58) Field of Classification Search
  None
  See application file for complete search history.

(56) References Cited

U.S. PATENT DOCUMENTS

| 5,203,340 A | * | 4/1993 | Gustafson | .......... A61B 5/02156 |
| | | | | 73/1.62 |
| 5,315,877 A | * | 5/1994 | Park | ...................... G01L 19/069 |
| | | | | 73/718 |
| 5,747,694 A | * | 5/1998 | Baba | .................... G01L 19/0084 |
| | | | | 73/723 |

(Continued)

FOREIGN PATENT DOCUMENTS

| JP | 63-177733 U | 11/1988 |
| JP | 07-151626 A | 6/1995 |

(Continued)

OTHER PUBLICATIONS

Communication dated Dec. 1, 2020 from the Japanese Patent Office in Application No. 2020-000169.

*Primary Examiner* — Lisa M Caputo
*Assistant Examiner* — Nigel H Plumb
(74) *Attorney, Agent, or Firm* — Sughrue Mion, PLLC; Richard C. Turner

(57) ABSTRACT

Provided is a differential pressure sensor capable of improving joining stability of a filter. The differential pressure sensor includes: a sensor module configured to detect a pressure difference between an atmospheric pressure and a pressure of a measured medium; a case body, which is configured to contain the sensor module, and in which an atmosphere introducing hole for introducing atmospheric air into the case body is formed; and a filter provided from inside the case body to cover the atmosphere introducing hole, the case body having a protrusion, which protrudes to an inside of the case body, the atmosphere introducing hole being formed in the protrusion, the filter being joined to the protrusion.

12 Claims, 3 Drawing Sheets

(56) References Cited

U.S. PATENT DOCUMENTS

| | | | | |
|---|---|---|---|---|
| 6,085,598 A | * | 7/2000 | Baba | G01L 19/003 |
| | | | | 73/756 |
| 2012/0144923 A1 | * | 6/2012 | Yahata | G01L 19/0654 |
| | | | | 73/754 |
| 2014/0026605 A1 | * | 1/2014 | Ishimura | F25B 25/005 |
| | | | | 62/222 |
| 2018/0252606 A1 | * | 9/2018 | Kishimoto | G01L 9/045 |

FOREIGN PATENT DOCUMENTS

| | | |
|---|---|---|
| JP | 09-43085 A | 2/1997 |
| JP | 6253825 B1 | 12/2017 |

\* cited by examiner

DIFFERENTIAL PRESSURE SENSOR WITH IMPROVED FILTER STABILITY

BACKGROUND OF THE INVENTION

1. Field of the Invention

The present disclosure relates to a differential pressure sensor configured to detect a pressure difference between an atmospheric pressure and a pressure of a measured medium.

2. Description of the Related Art

In Japanese Patent No. 6253825, a semiconductor differential pressure sensor is described. The semiconductor differential pressure sensor includes a pressure sensor module configured to detect a pressure difference between an atmospheric pressure and a pressure of a measured medium, a housing configured to contain the pressure sensor module, and a case. The housing and the case are each formed of a thermoplastic resin. The case has formed therein an atmosphere introducing hole for introducing the atmospheric pressure into the case. The atmosphere introducing hole is provided with a filter configured to prevent entering of dust and water into the case.

The filter of the semiconductor differential pressure sensor described in Japanese Patent No. 6253825 is joined to a joining surface, which is provided around the atmosphere introducing hole of inner wall surfaces of the case, by welding, for example. The joining surface of the case is formed on the same plane as the inner wall surface around the joining surface. The case thermally expands or shrinks with a change in ambient temperature. When the joining surface and the inner wall surface around the joining surface are formed on the same plane, the joining surface tends to be deformed due to the effect of the expansion or shrinkage of the case. Therefore, the semiconductor differential pressure sensor described in Japanese Patent No. 6253825 has a problem in that joining stability of the filter is reduced due to the deformation of the joining surface.

SUMMARY OF THE INVENTION

The present disclosure has been made to solve the above-mentioned problem, and therefore has an object to provide a differential pressure sensor capable of improving joining stability of a filter.

According to one embodiment of the present disclosure, there is provided a differential pressure sensor including: a sensor module configured to detect a pressure difference between an atmospheric pressure and a pressure of a measured medium; a case body, which is configured to contain the sensor module, and in which an atmosphere introducing hole for introducing atmospheric air into the case body is formed; and a filter provided from inside the case body to cover the atmosphere introducing hole, the case body having a protrusion, which protrudes to an inside of the case body, the atmosphere introducing hole being formed in the protrusion, the filter being joined to the protrusion.

According to the present disclosure, the joining stability of the filter of the differential pressure sensor can be improved.

DESCRIPTION OF THE EMBODIMENTS

First Embodiment

A differential pressure sensor according to a first embodiment of the present disclosure is described. In the first embodiment, a semiconductor differential pressure sensor is exemplified as the differential pressure sensor. The semiconductor differential pressure sensor according to the first embodiment is mounted to, for example, a gasoline tank of an automobile, and is used to detect a pressure variation of gasoline vapor.

Figure 1:
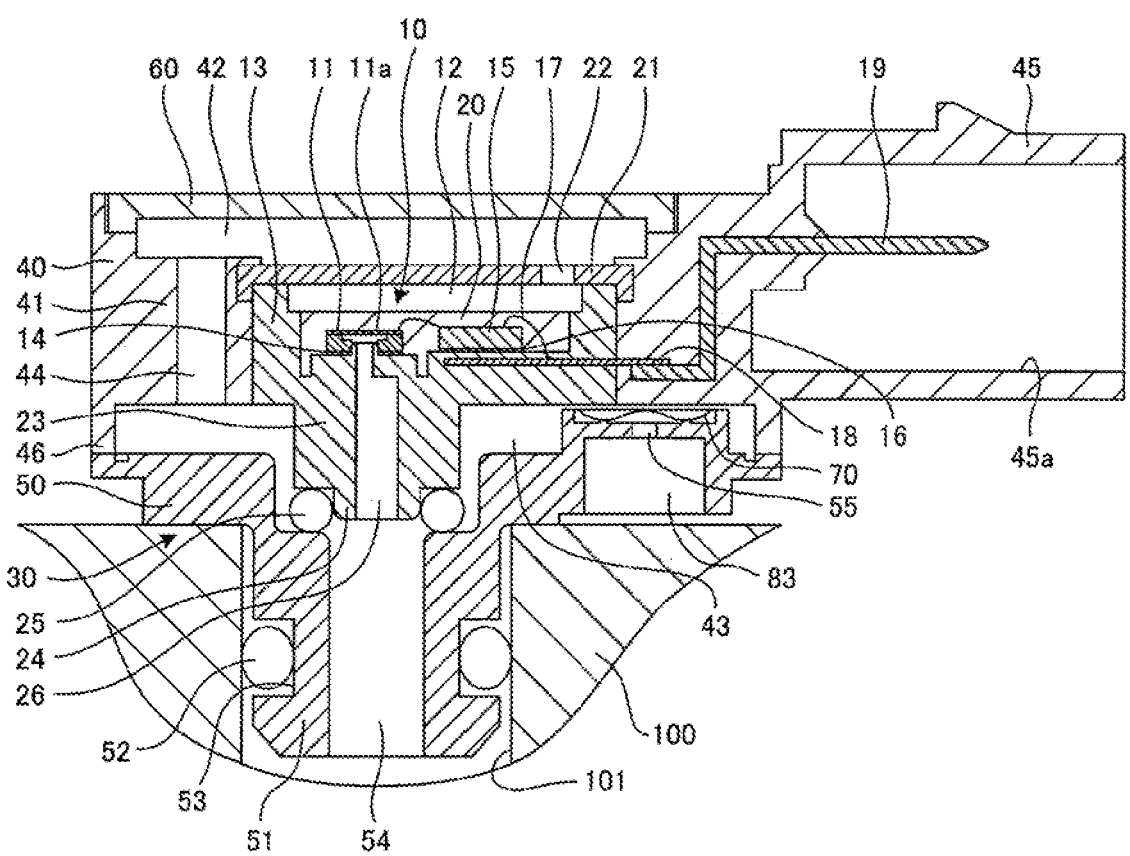
FIG. 1 is a sectional view for illustrating the structure of a semiconductor differential pressure sensor according to a first embodiment of the present disclosure.

FIG. 1 is a sectional view for illustrating the structure of the semiconductor differential pressure sensor according to the first embodiment. An up-and-down direction of FIG. 1 indicates, for example, a vertical direction. As illustrated in FIG. 1, the semiconductor differential pressure sensor is mounted on an open hole 101, which is formed in an upper surface portion of a gasoline tank 100.

The semiconductor differential pressure sensor includes a sensor module 10 configured to detect a pressure difference between an atmospheric pressure and a pressure of a measured medium. The sensor module 10 includes a pressure detection element 11, and a resin package 13 configured to hold the pressure detection element 11. The pressure detection element 11 is fixed to the resin package 13 by an adhesive layer 14. The adhesive layer 14 is formed with the use of a low-rigidity adhesive, such as a silicone resin. Further, above the resin package 13, a pressure reference chamber 12, into which atmospheric air is introduced, is formed. The pressure reference chamber 12 is provided adjacent to the pressure detection element 11.

The pressure detection element 11 includes a thin-film diaphragm 11a, which is arranged at a center portion of the pressure detection element 11, and an electric circuit (not shown) configured to detect strain of the diaphragm 11a. The pressure detection element 11 is formed with the use of a single crystal silicon substrate. On an upper surface of the diaphragm 11a, the atmospheric pressure, which is a pressure inside the pressure reference chamber 12, acts. On a lower surface of the diaphragm 11a, the pressure of the measured medium acts. The electric circuit includes a piezoresistor configured to detect the strain of the diaphragm 11a as a variation in resistance value.

The diaphragm 11a deforms by the pressure difference between the atmospheric pressure and the pressure of the measured medium. The electric circuit is configured to detect the pressure difference using the fact that the resistance value of the piezoresistor varies in accordance with a deformation amount of the diaphragm 11a. The pressure detection element 11 in the first embodiment is configured to detect the strain of the diaphragm 11a as the variation in resistance value, but the pressure detection element 11 may be configured to detect the strain of the diaphragm 11a as a variation in capacitance.

The sensor module 10 also includes an amplitude adjusting circuit 15. The amplitude adjusting circuit 15 is fixed to the resin package 13 by an adhesive layer 16, which is similar to the adhesive layer 14. The amplitude adjusting circuit 15 includes an amplifier circuit, an adjusting circuit, a read only memory (ROM), and other components. In the amplifier circuit, the pressure detected by the pressure detection element 11 is converted into an electric signal, and the electric signal is amplified. In the adjusting circuit, the amplified electric signal is adjusted to generate a voltage signal having predetermined output characteristics. In the ROM, adjustment data for use in the adjusting circuit is stored.

The pressure detection element 11 and the amplitude adjusting circuit 15 are connected to a lead frame 18 through a wire 17, which is formed of gold or aluminum. The lead frame 18 is connected to an external connection terminal 19 by welding or soldering. The voltage signal generated by the amplitude adjusting circuit 15 is output to the outside via the external connection terminal 19. The pressure detection element 11, the amplitude adjusting circuit 15, and the wire 17 are covered with a protective material 20. The protective material 20 is formed of fluorosilicone gel, fluorinated gel, or other material.

On the resin package 13, a cover 21 configured to cover an opening of the pressure reference chamber 12 is mounted. The cover 21 is mounted to the resin package 13 by bonding or press fitting. The resin package 13 is formed of a thermosetting resin, such as an epoxy resin. The cover 21 is formed of a thermoplastic resin, such as a polybutyleneterephtalate resin (PBT resin), or a polyphenylenesulfide resin (PPS resin). In the cover 21, one or more atmosphere introducing holes 22 for introducing the atmospheric air into the pressure reference chamber 12 are formed.

The resin package 13 has a cylindrical part 23, which is formed into a cylindrical shape. The cylindrical part 23 is located below the pressure detection element 11. At a lower end of the cylindrical part 23, a protruding portion 24 formed on the same axis as the cylindrical part 23 and into a cylindrical shape having a smaller diameter than the cylindrical part 23 is provided. Around an outer periphery of the protruding portion 24, an O ring 25 is fitted. The O ring 25 is in close contact with both of the resin package 13 and a case 50, which is to be described later. The protruding portion 24 has a chamfered leading end portion. Inside the cylindrical part 23 and the protruding portion 24, a measured medium introducing path 26 for introducing gasoline vapor as the measured medium is formed. The measured medium introducing path 26 penetrates through the cylindrical part 23 and the protruding portion 24 along a center axis of each of the cylindrical part 23 and the protruding portion 24. An upper end of the measured medium introducing path 26 is open upward to face the lower surface of the diaphragm 11a. A lower end of the measured medium introducing path 26 is open downward.

The sensor module 10 is contained in an inner space of a case body 30. The case body 30 includes a housing 40, the case 50, and a cover 60. The housing 40, the case 50, and the cover 60 are each formed of a thermoplastic resin, such as a PBT resin or a PPS resin.

The housing 40 includes a containing section 41 configured to contain the sensor module 10. The containing section 41 supports the sensor module 10 from an outer peripheral side thereof. The containing section 41 forms an upper space 42 located above the sensor module 10, and a lower space 43 located below the sensor module 10. The upper space 42 is connected to the pressure reference chamber 12 through the atmosphere introducing holes 22. The upper space 42 and the lower space 43 are connected to each other through an atmosphere introducing path 44 penetrating through the containing section 41.

The housing 40 also includes a connector 45 arranged to the side of the containing section 41. The connector 45 includes a recess 45a. Inside the recess 45a, an end portion of the external connection terminal 19 is exposed. The connector 45 is to be attached to a female-side connector (not shown) that is connected to a vehicle control unit.

The housing 40 is integrally formed with the sensor module 10, the cover 21, the lead frame 18, the external connection terminal 19, and other members by insert molding using a thermoplastic resin, such as a PBT resin or a PPS resin. In other words, the sensor module 10 is integrally formed with the housing 40 without using an adhesive.

On the containing section 41 of the housing 40, the cover 60 is mounted. An opening in an upper part of the upper space 42 is covered by the cover 60. The cover 60 is joined to the housing 40 by welding, bonding, or other method.

An outer peripheral part 46 provided in a lower portion of the housing 40 is joined to the case 50 by welding, bonding, or other method. An opening in a lower portion of the lower space 43 is covered by the case 50 and the O ring 25.

The case 50 has a cylindrical insertion part 51 to be inserted in the open hole 101 of the gasoline tank 100. In an outer peripheral surface of the insertion part 51, a groove 53 for fitting an O ring 52 is formed. The O ring 52 is in close contact with both of the outer peripheral surface of the insertion part 51 and an inner peripheral surface of the open hole 101. With this structure, the gasoline vapor inside the gasoline tank 100 is prevented from leaking through a gap between the open hole 101 and the insertion part 51 to the outside.

Inside the insertion part 51, a measured medium introducing path 54 for introducing the gasoline vapor as the measured medium is formed. The measured medium introducing path 54 penetrates through the insertion part 51 along an axial direction of the insertion part 51. An upper end of the measured medium introducing path 54 is open upward to face the lower end of the measured medium introducing path 26 formed in the resin package 13. A lower end of the measured medium introducing path 54 is open downward to face a space inside the gasoline tank 100. The measured medium introducing path 54 is connected to both of the measured medium introducing path 26 of the resin package 13 and the space inside the gasoline tank 100. The measured medium introducing path 54 and the measured medium introducing path 26 are separated from the lower space 43 by the O ring 25.

In the case 50, an atmosphere introducing hole 55 for introducing the atmospheric air into the lower space 43 is formed. The atmosphere introducing hole 55 is formed downward in a lower surface of the case 50. The lower space 43 is connected to a space outside the case body 30 through the atmosphere introducing hole 55. In the first embodiment, one atmosphere introducing hole 55 is provided, but a plurality of atmosphere introducing holes 55 may be provided.

When dust or water enters inside the case 50 through the atmosphere introducing hole 55, a malfunction may occur in the pressure detection element 11 or other component. Therefore, to the atmosphere introducing hole 55, a filter 70 configured to prevent dust or water from entering inside the case 50 is provided. The filter 70 is provided from inside the case 50 to cover the atmosphere introducing hole 55. The filter 70 is formed of, for example, a resin mesh. An outer peripheral shape of the filter 70 is, for example, circular.

As described above, the case 50 has formed therein the measured medium introducing path 54 for introducing the gasoline vapor inside the gasoline tank 100 into the case 50, and the atmosphere introducing hole 55 for introducing the atmospheric air outside the case body 30 into the case 50.

The gasoline vapor inside the gasoline tank 100 is introduced to the sensor module 10 through the measured medium introducing path 54 and the measured medium introducing path 26. As a result, a pressure of the gasoline vapor acts on the lower surface of the diaphragm 11*a*.

The atmospheric air outside the case body 30 is introduced into the pressure reference chamber 12 through the atmosphere introducing hole 55, the filter 70, the lower space 43, the atmosphere introducing path 44, the upper space 42, and the atmosphere introducing holes 22. As a result, the atmospheric pressure to be used as a reference pressure acts on the upper surface of the diaphragm 11*a*.

Figure 2:
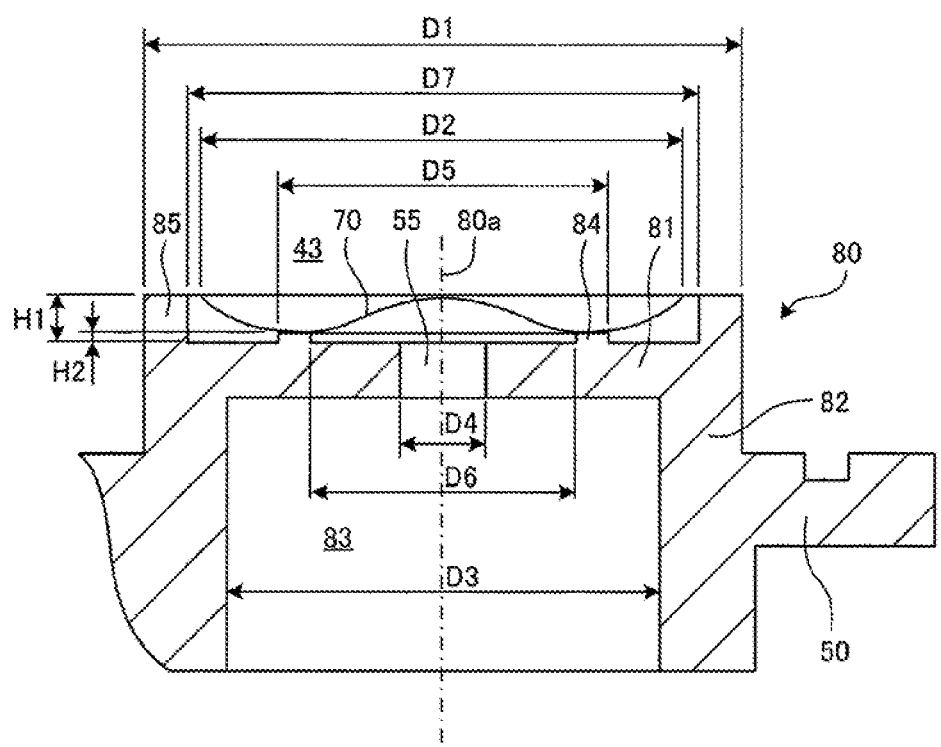
FIG. 2 is a sectional view for illustrating the structures of an atmosphere introducing hole and a filter of the semiconductor differential pressure sensor according to the first embodiment.
Figure 3:
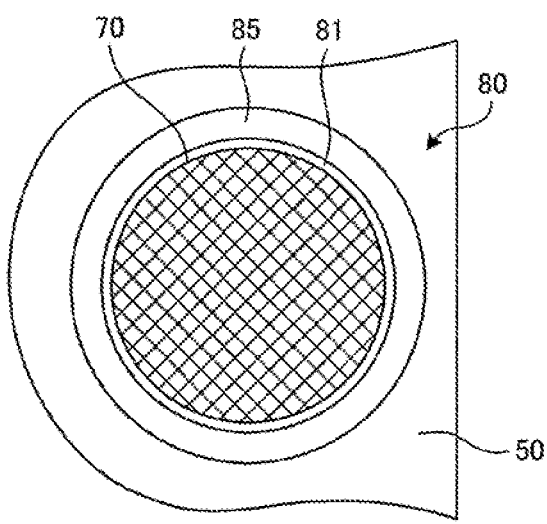
FIG. 3 is a top view for illustrating the structures of a protrusion and the filter of the semiconductor differential pressure sensor according to the first embodiment.
Figure 4:
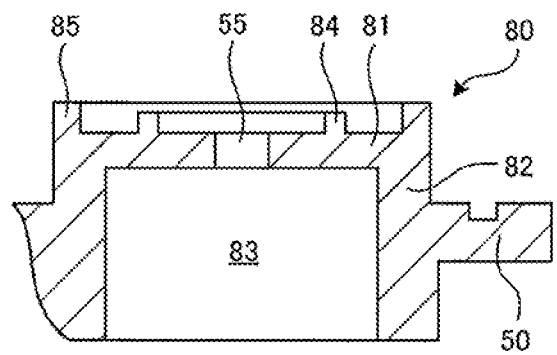
FIG. 4 is a sectional view for illustrating the structure of the atmosphere introducing hole before the filter is mounted in the semiconductor differential pressure sensor according to the first embodiment.
Figure 5:
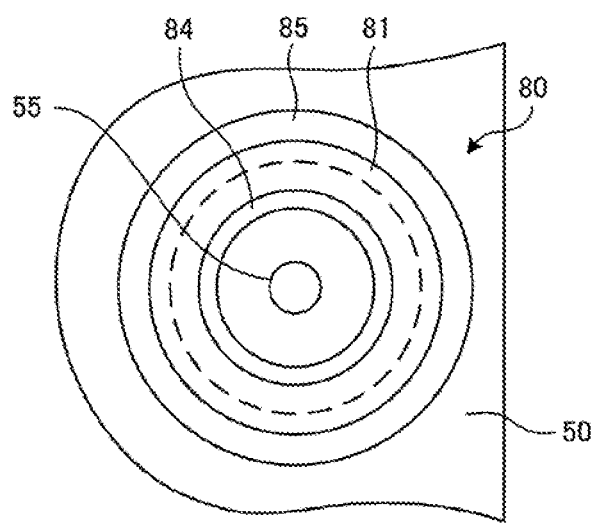
FIG. 5 is a top view for illustrating the structure of the atmosphere introducing hole before the filter is mounted in the semiconductor differential pressure sensor according to the first embodiment.

FIG. 2 is a sectional view for illustrating the structures of the atmosphere introducing hole 55 and the filter 70 of the semiconductor differential pressure sensor according to the first embodiment. FIG. 3 is a top view for illustrating the structures of a protrusion 80 and the filter 70 of the semiconductor differential pressure sensor according to the first embodiment. FIG. 4 is a sectional view for illustrating the structure of the atmosphere introducing hole 55 before the filter 70 is mounted in the semiconductor differential pressure sensor according to the first embodiment. FIG. 5 is a top view for illustrating the structure of the atmosphere introducing hole 55 before the filter 70 is mounted in the semiconductor differential pressure sensor according to the first embodiment. In FIG. 5, a contour of the filter 70 to be mounted later is indicated by the broken line. An up-and-down direction of each of FIG. 2 and FIG. 4 indicates, for example, the vertical direction.

As illustrated in FIG. 2 to FIG. 5, the case 50 includes the protrusion 80 that projects toward the lower space 43, that is, to the inside of the case 50. The protrusion 80 is formed so that an inner wall surface of the case 50 projects, and an outer wall surface of the case 50 is recessed. The protrusion 80 has a planer upper surface portion 81, a side surface portion 82 formed around the upper surface portion 81, and an annular projection 84 formed on the upper surface portion 81. In the first embodiment, the protrusion 80 has a cylindrical shape. A center axis 80*a* of the protrusion 80 is parallel to, for example, the vertical direction. The center axis 80*a* of the protrusion 80 is also parallel to, for example, an insertion direction of the semiconductor differential pressure sensor with respect to the open hole 101.

The upper surface portion 81 is formed into a disc shape. The side surface portion 82 is formed into a cylindrical surface shape. As viewed along the center axis 80*a*, an area of the upper surface portion 81 is larger than an area of the filter 70. In other words, as viewed along the center axis 80*a*, a diameter D1 of the upper surface portion 81 is larger than a diameter D2 of the filter 70 (D1>D2).

Outside the case 50, a hollow portion 83 having a cylindrical shape, that is, having a circular shape in cross section is formed. A center axis of the hollow portion 83 coincides with the center axis 80*a* of the protrusion 80. At an upper end of the hollow portion 83, the upper surface portion 81 is provided. A lower end of the hollow portion 83 is open.

The atmosphere introducing hole 55 is formed at a center portion of the upper surface portion 81. The atmosphere introducing hole 55 has a circular shape in cross section, and is formed on the same axis as the hollow portion 83. A center axis of the atmosphere introducing hole 55 coincides with the center axis 80*a* of the protrusion 80.

A sectional area of the hollow portion 83 is larger than a sectional area of the atmosphere introducing hole 55. In other words, as viewed along the center axis 80*a*, a diameter D3 of the hollow portion 83 is larger than a diameter D4 of the atmosphere introducing hole 55 (D3>D4). Air outside the case body 30 flows into the atmosphere introducing hole 55 through the hollow portion 83.

The annular projection 84 projects from the upper surface portion 81 to the inside of the case 50. A protruding direction of the annular projection 84 is the same as a protruding direction of the protrusion 80. The annular projection 84 is provided to surround the atmosphere introducing hole 55 as viewed along the center axis 80*a*. The annular projection 84 is formed into an annular shape that is on the same axis as the atmosphere introducing hole 55. A center axis of the annular projection 84 coincides with the center axis 80*a* of the protrusion 80. As viewed along the center axis 80*a*, an area of a portion surrounded by the annular projection 84 is smaller than the area of the filter 70. In other words, as viewed along the center axis 80*a*, an inner diameter D6 of the annular projection 84 is smaller than the diameter D2 of the filter 70 (D6<D2). Further, as viewed along the center axis 80*a*, the inner diameter D6 of the annular projection 84 is larger than the diameter D4 of the atmosphere introducing hole 55 (D6>D4). An outer diameter D5 of the annular projection 84 is smaller than the diameter D2 of the filter 70 in FIG. 2, but may be equal to or larger than the diameter D2.

The filter 70 is joined to the annular projection 84 by welding or other method. The filter 70 is joined to the annular projection 84 over the entire perimeter. For example, the filter 70 is not joined to parts other than the annular projection 84.

On the upper surface portion 81, an outer wall portion 85 protruding to the inside of the case 50 is formed. A protruding direction of the outer wall portion 85 is the same as the protruding direction of the protrusion 80. A protrusion height H1 of the outer wall portion 85 is higher than a protrusion height H2 of the annular projection 84 after the filter 70 is joined. The outer wall portion 85 is provided to surround an outer periphery of the filter 70. The outer wall portion 85 is formed into an annular shape that is on the same axis as the atmosphere introducing hole 55. A center axis of the outer wall portion 85 coincides with the center axis 80*a* of the protrusion 80. As viewed along the center axis 80*a*, an area of a portion surrounded by the outer wall portion 85 is larger than the area of the filter 70. In other words, as viewed along the center axis 80*a*, an inner diameter D7 of the outer wall portion 85 is larger than the diameter D2 of the filter 70 (D7>D2). The outer wall portion 85 is provided to regulate, for example, a mounting position of the filter 70.

When the filter 70 is to be welded to the annular projection 84, an upper surface over the entire perimeter of the annular projection 84 is heated and melted with the use of a heated trowel or other device so that the melted resin gets into the mesh of the filter 70. Then, the melted resin is cooled and solidified. As a result, the filter 70 is joined to the annular projection 84. The filter 70 may be bent in a radial section as illustrated in FIG. 2 when being joined to the annular projection 84.

In the first embodiment, the protrusion 80, the hollow portion 83, the annular projection 84, the outer wall portion 85, and the filter 70 all have a circular shape as viewed along the center axis 80a, but the present disclosure is not limited thereto. Some or all of the protrusion 80, the upper surface portion 81, the hollow portion 83, the annular projection 84, the outer wall portion 85, and the filter 70 may have a polygonal shape, such as a rectangular shape, as viewed along the center axis 80a. For example, the protrusion 80 may have a rectangular shape as viewed along the center axis 80a. In this case, the annular projection 84 and the outer wall portion 85 may each have a rectangular shape, or the atmosphere introducing hole 55 and the hollow portion 83 may each have a rectangular shape as viewed along the center axis 80a.

Further, the protrusion 80 in the first embodiment has the annular projection 84, but the present disclosure is not limited thereto. The protrusion 80 may have no annular projection 84. In this case, the filter 70 is joined to the protrusion 80 from inside the case body 30 to cover the atmosphere introducing hole 55.

As described above, the semiconductor differential pressure sensor according to the first embodiment includes the sensor module 10, the case body 30, and the filter 70. The sensor module 10 is configured to detect the pressure difference between the atmospheric pressure and the pressure of the measured medium. The case body 30 contains the sensor module 10, and has formed therein the atmosphere introducing hole 55 for introducing the atmospheric air into the case body 30. The filter 70 is provided from inside the case body 30 to cover the atmosphere introducing hole 55. The case body 30 has the protrusion 80, which protrudes to the inside of the case body 30. The atmosphere introducing hole 55 is formed in the protrusion 80. The filter 70 is joined to the protrusion 80. Here, the semiconductor differential pressure sensor is an example of the differential pressure sensor.

According to the above-mentioned structure, the surface of the protrusion 80 to which the filter 70 is joined is not on the same plane as an inner wall surface of the case body 30 located around the protrusion 80, but is provided independently of the inner wall surface. Therefore, even when the case body 30 thermally expands or shrinks, the protrusion 80 is hardly deformed under the effect of the expansion or shrinkage of the case body 30. Further, even when the inner wall surface of the case body 30 sinks during molding of the case body 30, the protrusion 80 is hardly deformed or strained. As a result, the filter 70 can be joined to the protrusion 80 firmly and stably. Therefore, according to the above-mentioned structure, joining stability of the filter 70 can be improved. Consequently, the filter 70 can be prevented from being peeled off.

In the differential pressure sensor according to the first embodiment, the protrusion 80 has the upper surface portion 81, and the atmosphere introducing hole 55 is formed in the upper surface portion 81. The protrusion 80 further has the annular projection 84, which projects from the upper surface portion 81 to the inside of the case body 30 and surrounds the atmosphere introducing hole 55. The filter 70 is joined to the annular projection 84.

When the case body 30 and the filter 70 are joined to each other on surfaces thereof, it is required to ensure that a joining surface of the case body 30 have high flatness. In contrast, with the above-mentioned structure, a joining portion of the case body 30 is limited to the upper surface of the annular projection 84. Therefore, it is not required of the annular projection 84, which is to be joined to the filter 70, to have as high flatness as required in the case of joining on the surfaces. Therefore, according to the above-mentioned structure, production yield of the semiconductor differential pressure sensor can be increased.

Further, in the step of welding the filter 70 to the annular projection 84, only the annular projection 84 to serve as the joining portion may be locally heated and melted with the use of the heated trowel or other device. Therefore, thermal efficiency in melting the annular projection 84 can be increased, and melting time for the joining portion can be reduced. Therefore, according to the above-mentioned structure, production time for the semiconductor differential pressure sensor can be reduced.

In the differential pressure sensor according to the first embodiment, the protrusion 80 has a cylindrical shape, in which the hollow portion 83 is formed outside the case body 30. According to this structure, heat radiation efficiency of the protrusion 80 can be increased by the hollow portion 83. Therefore, in the step of welding the filter 70 to the annular projection 84, cooling time after the joining portion is melted can be reduced. Therefore, according to the above-mentioned structure, the production time for the semiconductor differential pressure sensor can be reduced.

In the differential pressure sensor according to the first embodiment, the atmosphere introducing hole 55 is formed on the same axis as the hollow portion 83. The hollow portion 83 has a sectional area that is larger than a sectional area of the atmosphere introducing hole 55. According to this structure, the heat radiation efficiently of the protrusion 80 can be further increased. Therefore, the cooling time after the joining portion is melted can be reduced. Therefore, according to the above-mentioned structure, the production time for the semiconductor differential pressure sensor can be reduced.

In the differential pressure sensor according to the first embodiment, the upper surface portion 81 has the outer wall portion 85 formed thereon to project to the inside of the case body 30 and surround the outer periphery of the filter 70. According to this structure, the mounting position of the filter 70 is regulated by the outer wall portion 85, and hence misalignment of the filter 70 can be prevented.

What is claimed is:

1. A differential pressure sensor, comprising:
a sensor module configured to detect a pressure difference between an atmospheric pressure and a pressure of a measured medium;
a case body, which is configured to contain the sensor module, and in which an atmosphere introducing hole for introducing atmospheric air into the case body is formed; and
a filter provided from inside the case body to cover the atmosphere introducing hole,
the case body having a protrusion, which protrudes to an inside of the case body,
the atmosphere introducing hole being formed in the protrusion,
the filter being joined to the protrusion,
wherein the protrusion further comprises an annular projection formed on the inside of the case body, and
wherein the filter is joined to the annular projection.

2. The differential pressure sensor according to claim 1, wherein the protrusion has an upper surface portion,
wherein the atmosphere introducing hole is formed in the upper surface portion, and
wherein the annular projection projects from the upper surface portion to the inside of the case body and surrounds the atmosphere introducing hole.

3. The differential pressure sensor according to claim 2, wherein the upper surface portion has an outer wall portion formed thereon to project to the inside of the case body and surround an outer periphery of the filter.

4. The differential pressure sensor according to claim 2, wherein the protrusion has a cylindrical shape, in which a hollow portion is formed outside the case body.

5. The differential pressure sensor according to claim 4,
wherein the atmosphere introducing hole is formed on the same axis as the hollow portion, and
wherein the hollow portion has a sectional area that is larger than a sectional area of the atmosphere introducing hole.

6. The differential pressure sensor according to claim 5, wherein the upper surface portion has an outer wall portion formed thereon to project to the inside of the case body and surround an outer periphery of the filter.

7. The differential pressure sensor according to claim 4, wherein the upper surface portion has an outer wall portion formed thereon to project to the inside of the case body and surround an outer periphery of the filter.

8. The differential pressure sensor according to claim 1, wherein the protrusion has a cylindrical shape, in which a hollow portion is formed outside the case body.

9. The differential pressure sensor according to claim 8,
wherein the atmosphere introducing hole is formed on the same axis as the hollow portion, and
wherein the hollow portion has a sectional area that is larger than a sectional area of the atmosphere introducing hole.

10. The differential pressure sensor according to claim 9, wherein an upper surface portion of the protrusion has an outer wall portion formed thereon to project to the inside of the case body and surround an outer periphery of the filter.

11. The differential pressure sensor according to claim 8, wherein an upper surface portion of the protrusion has an outer wall portion formed thereon to project to the inside of the case body and surround an outer periphery of the filter.

12. The differential pressure sensor according to claim 1, wherein an upper surface portion of the protrusion has an outer wall portion formed thereon to project to the inside of the case body and surround an outer periphery of the filter.

* * * * *